United States Patent
Jougit et al.

(10) Patent No.: US 8,576,884 B2
(45) Date of Patent: *Nov. 5, 2013

(54) JITTER BUFFER ADAPTATION BASED ON AUDIO CONTENT

(75) Inventors: Mickael Jougit, Mougins le Haut (FR); Laurent Pilati, Antibes (FR)

(73) Assignee: Broadcom Corporation, Irvine, CA (US)

( * ) Notice: Subject to any disclaimer, the term of this patent is extended or adjusted under 35 U.S.C. 154(b) by 318 days.

This patent is subject to a terminal disclaimer.

(21) Appl. No.: 12/942,856

(22) Filed: Nov. 9, 2010

(65) Prior Publication Data
US 2011/0051957 A1 Mar. 3, 2011

Related U.S. Application Data

(63) Continuation of application No. 12/019,044, filed on Jan. 24, 2008, now Pat. No. 7,852,882.

(51) Int. Cl.
*H04J 3/06* (2006.01)
*G06F 15/173* (2006.01)

(52) U.S. Cl.
USPC .......................................... 370/516; 709/226

(58) Field of Classification Search
None
See application file for complete search history.

(56) References Cited

U.S. PATENT DOCUMENTS

| | | | | |
|---|---|---|---|---|
| 7,450,601 | B2 * | 11/2008 | Sundqvist et al. | 370/412 |
| 7,852,882 | B2 | 12/2010 | Jougit et al. | |
| 2004/0247136 | A1 * | 12/2004 | Wallace | 381/56 |
| 2005/0058145 | A1 * | 3/2005 | Florencio et al. | 370/412 |
| 2008/0165766 | A1 * | 7/2008 | Synnergren | 370/352 |
| 2008/0256115 | A1 * | 10/2008 | Beletski et al. | 707/102 |
| 2008/0262856 | A1 * | 10/2008 | Megeid et al. | 704/503 |
| 2009/0168673 | A1 | 7/2009 | Kalampoukas et al. | |
| 2009/0190614 | A1 | 7/2009 | Jougit et al. | |

\* cited by examiner

*Primary Examiner* — John Blanton
(74) *Attorney, Agent, or Firm* — Fiala & Weaver P.L.L.C.

(57) ABSTRACT

A system and method for discarding or inserting audio frames in a jitter buffer is described. The system and method provides improved audio quality as compared to conventional jitter buffer management systems. In one embodiment, buffer control logic determines whether to discard audio frames to be stored in a jitter buffer or to insert audio frames among audio frames to be output from a jitter buffer based not only on the number of audio frames currently stored in the jitter buffer but also based on the power of the current audio frame to be stored in or output from the jitter buffer. The system and method is generally applicable to any wireless or wired communication system in which audio signals are transmitted between entities operating in different clock domains.

20 Claims, 7 Drawing Sheets

JITTER BUFFER ADAPTATION BASED ON AUDIO CONTENT

CROSS-REFERENCE TO RELATED APPLICATIONS

This application is a continuation of U.S. patent application Ser. No. 12/019,044 filed on Jan. 24, 2008, the entirety of which is incorporated by reference herein.

BACKGROUND OF THE INVENTION

1. Field of the Invention

The invention generally relates to communication systems in which audio content is transmitted between entities. In particular, the invention relates to systems and methods for improving perceived audio quality in communication systems in which audio content is transmitted between entities operating in different clock domains.

2. Background

In a communication system in which audio content is transmitted between two entities over a wireless link, clock drift between the two entities can result in a degradation of perceived audio quality. For example, in a Bluetooth™ wireless communication system, a wireless link may be established between two Bluetooth™-enabled devices. The wireless link may then be used to transmit audio signals between the two devices, wherein each device uses its own clock for sampling the audio signals. Because there will always be a drift between the two clocks, each device may periodically be required to drop an audio frame from or insert an audio frame within a received audio signal to compensate for the drift. The dropping or insertion of the audio frame creates discontinuities that ultimately impair the quality of the received audio signal when perceived by a listener.

To help illustrate this, FIG. 1 shows a conventional wireless audio communication system 100 that includes a Bluetooth™ enabled cellular telephone 102 and a Bluetooth™ headset 104. As will be appreciated by persons skilled in the relevant art(s), a bidirectional Synchronous Connection Oriented (SCO) link 106 may be established between cellular telephone 102 and headset 104 by which audio signals may be wirelessly transmitted from cellular telephone 102 to headset 104 and by which audio signals may be wirelessly transmitted from headset 104 to cellular telephone 102. For the purpose of this example, however, only the wireless transfer of an audio signal from headset 104 to cellular telephone 102 will be discussed.

Headset 104 operates in a well-known manner to sample an audio signal from an audio source. Typically, the audio source is a user of the headset and the audio signal represents the user's speech. Discrete segments of the audio signal, termed audio frames, are temporarily stored in a jitter buffer 122 within a Bluetooth™ controller 120. Bluetooth controller 120 then operates on the audio frames stored in jitter buffer 122 in a first-in first-out fashion to transmit the frames over wireless link 106 to cellular telephone 102. At cellular telephone 102, the wirelessly-transmitted audio frames are received by Bluetooth™ controller 110 and temporarily accumulated within a jitter buffer 112 prior to being transferred in a first-in first-out fashion to cellular baseband logic 114 for further processing. The interface between Bluetooth™ controller 110 and cellular baseband logic 114, designated interface 116, is typically a PCM interface.

The clock domain of headset 104 is different than the clock domain of interface 116. By buffering a number of audio frames, jitter buffer 112 can help compensate for this difference, but only to a certain extent. For example, because jitter buffer 112 has a limited size, when the number of audio frames available in jitter buffer 112 becomes too great, Bluetooth™ controller 110 must drop audio frames. Furthermore, when there are too few audio frames available in jitter buffer 112, Bluetooth™ controller 110 must insert audio frames (typically representing silence) in order to continue to provide frames to interface 116. A common method for implementing this is to maintain a fixed high watermark and a fixed low watermark for jitter buffer 112. When the number of audio frames stored in jitter buffer 112 exceeds the high watermark, frames are dropped. When the number of audio frames stored in jitter buffer 112 drops below the low watermark, frames are inserted. Each time a frame is dropped or inserted in this manner, a discontinuity in the audio signal is created. This discontinuity greatly impacts the quality of the audio signal as perceived by a listener since human hearing is very sensitive to phase changes.

FIG. 2 depicts a graph 200 that illustrates how an output audio signal may be impacted by the dropping of frames from a jitter buffer in a conventional system implementation. In particular, FIG. 2 shows the magnitude of an audio signal 202 output from a jitter buffer over time. Also shown in graph 200 (as an overlay) is the number of frames in the jitter buffer, designated jitter buffer level 204, as well as the maximum jitter buffer level 206 over the same time period. As shown in graph 200, when the number of frames in the jitter buffer reaches the maximum jitter buffer level, a number of frames are immediately discarded. In the system from which graph 200 was derived, one half of the frames in the jitter buffer are discarded when the maximum level is reached. As also shown in graph 200, when the frames are discarded, a corresponding phase discontinuity is introduced into audio output signal 202. One example of this is shown in the area circled by a dotted line 208. Such discontinuities can have a significantly negative impact on the quality of audio output signal as perceived by a listener.

As will be appreciated by persons skilled in the relevant art(s), the foregoing problem is not limited to Bluetooth™ wireless communication systems but can also occur in any wireless or wired communication system in which audio signals are transmitted between entities operating in different clock domains.

What is needed then is a system and method for discarding or inserting audio frames in a jitter buffer that provides improved audio quality as compared to conventional jitter buffer management systems. The desired system and method should be generally applicable to any wireless or wired communication system in which audio signals are transmitted between entities operating in different clock domains.

BRIEF SUMMARY OF THE INVENTION

A system and method is described herein for discarding or inserting audio frames in a jitter buffer that advantageously provides improved audio quality as compared to conventional jitter buffer management systems. As will be described in more detail herein, an embodiment of the present invention determines whether to discard audio frames to be stored in a jitter buffer or to insert audio frames among audio frames to be output from a jitter buffer based not only on the number of audio frames currently stored in the jitter buffer but also based on the power of the current audio frame to be stored in or output from the jitter buffer. The system and method is generally applicable to any wireless or wired communication system in which audio signals are transmitted between entities operating in different clock domains.

In particular, a method for generating an output audio signal in a communication system is described herein. In accordance with the method, a segment of an audio signal is received. The received segment is one of a series of segments of an audio signal transmitted over a communication link. An estimate of the power of the received segment is obtained and compared to a power threshold that varies in a manner that depends on a current number of segments stored in a jitter buffer. If the estimated power of the received segment exceeds the power threshold, then the received segment is stored in the jitter buffer. Otherwise, the received segment is discarded. An output audio signal is then generated from segments stored in the jitter buffer.

In accordance with the foregoing method, the received segment of the audio signal may be a frame of the audio signal and the series of segments of the audio signal may be transmitted over either a wired or wireless communication link. Furthermore, obtaining an estimate of the power of the received segment may include calculating the root mean squared power of the received segment. Additionally, the power threshold may increase as the current number of segments stored in the jitter buffer increases.

An alternate method for generating an output audio signal in a communication system is also described herein. In accordance with the method, a segment of an audio signal stored in a jitter buffer is identified. The identified segment is one of a series of segments of an audio signal received over a communication link and stored in the jitter buffer. An estimate of the power of the identified segment is obtained and compared to a power threshold that varies in a manner that depends on a current number of segments stored in the jitter buffer. If the estimated power of the identified segment exceeds the power threshold, the identified segment is provided for the generation of an output audio signal. Otherwise, an inserted segment, such as a segment representing silence, is provided instead of the identified segment for the generation of the output audio signal.

In accordance with the foregoing method, the identified segment of the audio signal may be a frame of the audio signal and the series of segments of the audio signal may be received over a wired or wireless communication link. Furthermore, obtaining an estimate of the power of the identified segment may include calculating the root mean squared power of the identified segment. Additionally, the power threshold may increase as the current number of segments stored in the jitter buffer decreases.

A system for generating an output audio signal is also described herein. The system includes a jitter buffer, buffer control logic and audio output logic. The buffer control logic is configured to receive a series of segments of an audio signal transmitted over a communication link. The buffer control logic is further configured to obtain an estimate of the power of each of the received segments. The buffer control logic is still further configured to store a received segment in the jitter buffer if the estimated power of the received segment exceeds a power threshold and to discard a received segment if the estimated power of the received segment does not exceed the power threshold. The power threshold varies in a manner that depends on a current number of segments stored in the jitter buffer. The audio output logic is configured to generate an output audio signal from segments stored in the jitter buffer.

In accordance with the foregoing system, the series of segments of the audio signal may be a series of frames and the buffer control logic may be configured to receive the series of segments of the audio signal over either a wired or wireless communication link. The buffer control logic may also be configured to obtain an estimate of the power of each of the received segments by calculating the root mean squared power of each of the received segments. The power threshold may increase as the current number of segments stored in the jitter buffer increases.

An alternate system for generating an output audio signal is also described herein. The system includes a jitter buffer and buffer control logic. The buffer control logic is configured to identify segments of an audio signal stored in a jitter buffer, wherein the segments comprise a series of segments of an audio signal received over a communication link and stored in the jitter buffer. The buffer control logic is further configured to obtain an estimate of the power of each identified segment. The buffer control logic is still further configured to provide an identified segment for the generation of an output audio signal if the estimated power of the identified segment exceeds a power threshold and to provide an inserted segment, such as a segment representing silence, instead of an identified segment for the generation of the output audio signal if the estimated power of the identified segment does not exceed the power threshold. The power threshold varies in a manner that depends on a current number of segments stored in the jitter buffer.

In accordance with the foregoing system, the series of segments of the audio signal may be a series of frames and the identified segments may comprise a series of segments of an audio signal received either over a wired or wireless communication link. The buffer control logic may also be configured to obtain an estimate of the power of an identified segment by calculating the root mean squared power of the identified segment. The power threshold may increase as the current number of segments stored in the jitter buffer decreases.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
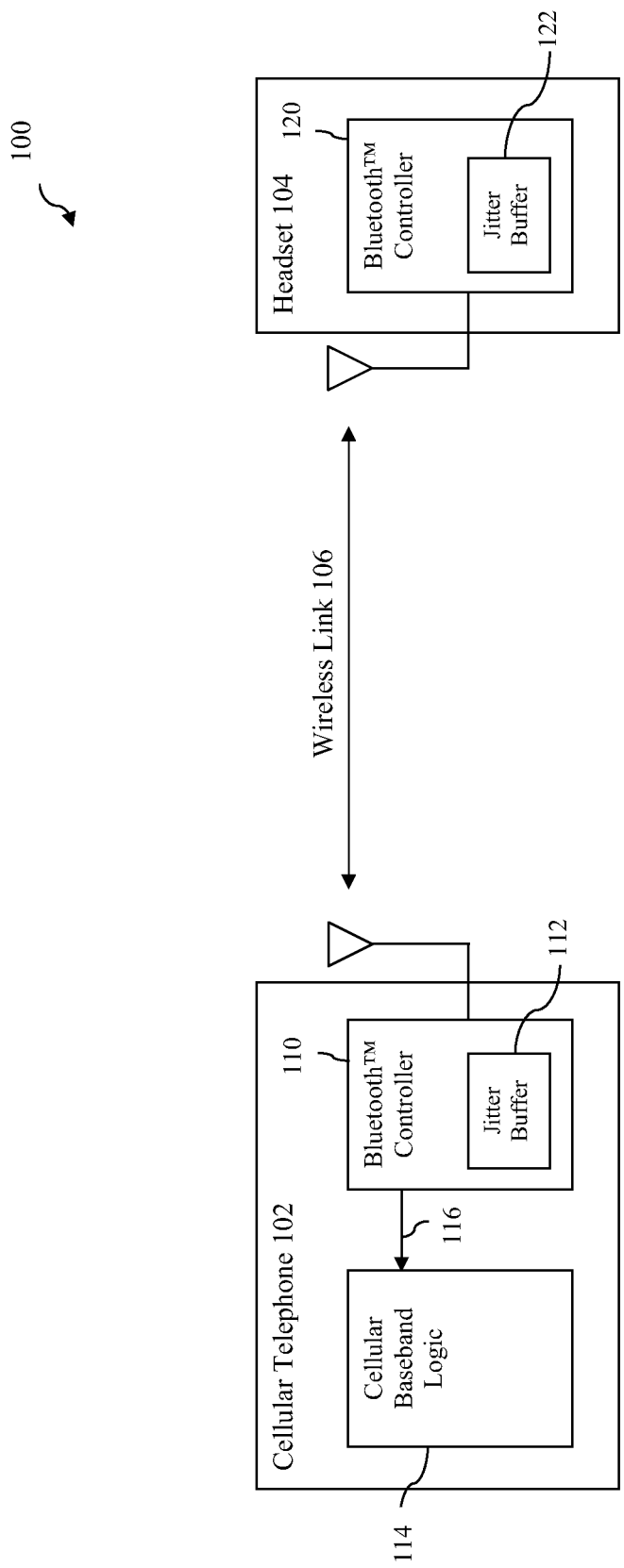
FIG. 1 is a block diagram of a conventional wireless audio communication system that includes a Bluetooth™ enabled cellular telephone and a Bluetooth™ headset.
Figure 2:
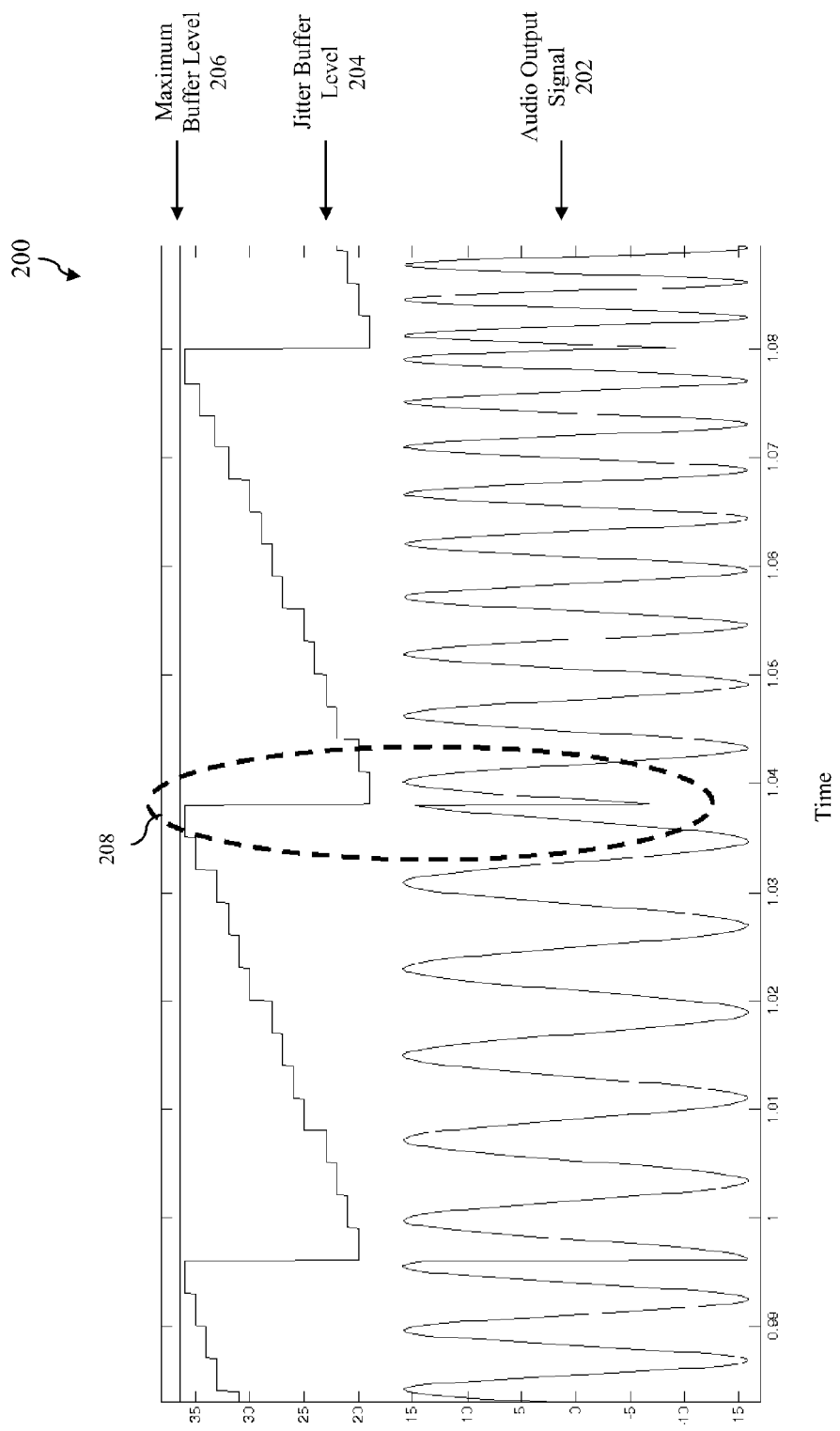
FIG. 2 depicts a graph that illustrates how an output audio signal may be impacted by the dropping of frames from a jitter buffer in a conventional communication system.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

Figure 3:
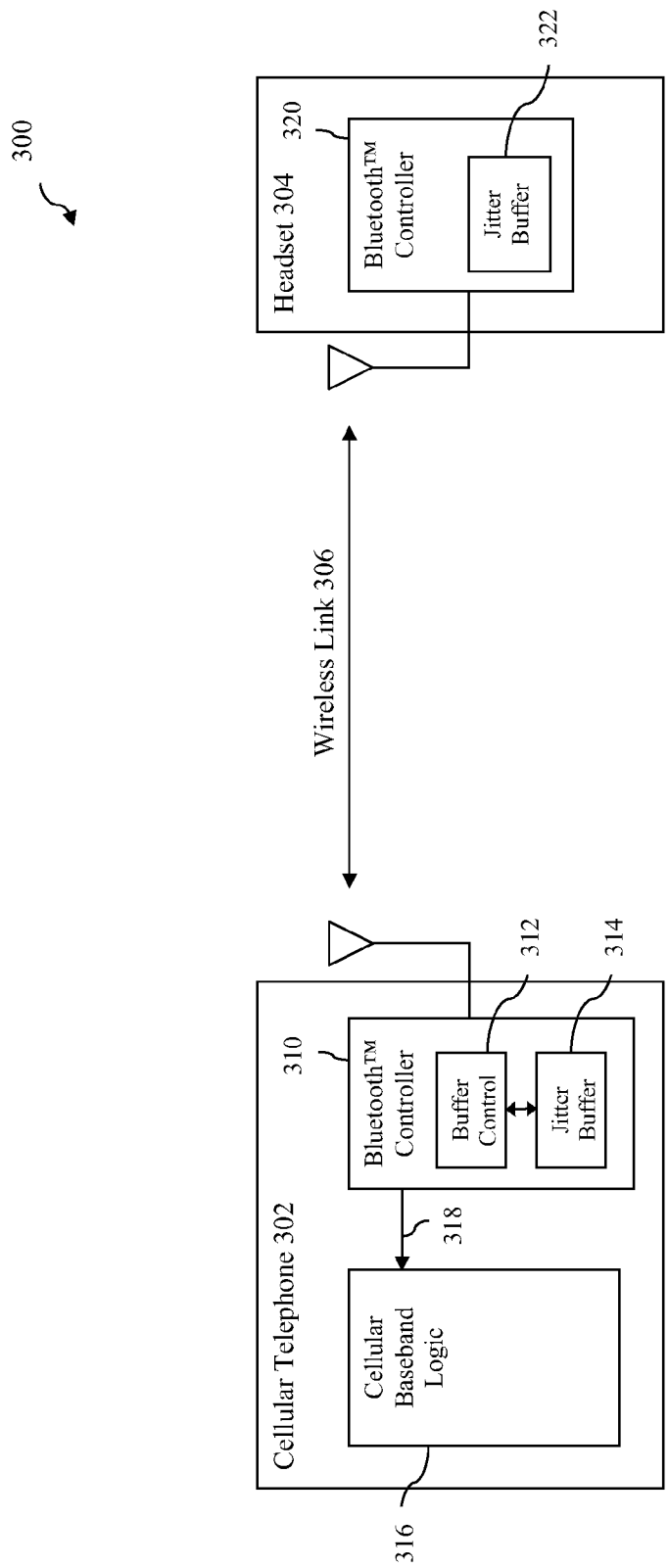
FIG. 3 depicts an example wireless communication system in accordance with an embodiment of the present invention that includes a Bluetooth™ enabled cellular telephone and a Bluetooth™ headset.

A. Example Wireless Communication System in Accordance with an Embodiment of the Present Invention FIG. 3 depicts an example wireless communication system 300 in accordance with an embodiment of the present invention. As shown in FIG. 3, wireless communication system 300 includes a Bluetooth™ enabled cellular telephone 302 and a Bluetooth™ headset 304. Cellular telephone 302 includes a Bluetooth™ controller 310 and headset 304 includes a Bluetooth™ controller 320. Controllers 310 and 320 are each configured to transmit and receive audio signals in a manner consistent with specifications published by the Bluetooth™ Special Interest Group (SIG). In particular, Bluetooth™ controllers 310 and 320 may be used to establish a bidirectional SCO link 306 between cellular telephone 302 and headset 304 by which audio signals may be wirelessly transmitted from cellular telephone 302 to headset 304 and by which audio signals may be wirelessly transmitted from headset 304 to cellular telephone 302.

For the purpose of further illustrating this embodiment of the present invention, the manner in which an audio signal is wirelessly transferred from headset 304 to cellular telephone 302 will now be described.

Headset 304 is configured to sample an audio signal from an audio source. The audio source may be, for example, a user of headset 304 and the audio signal may represent the user's speech. However, this example is not intended to be limiting and the audio source may be any entity capable of producing sounds. Bluetooth™ controller 320 is configured to store discrete segments of the audio signal, termed audio frames, in a jitter buffer 322 within controller 320. Bluetooth controller 320 is further configured to operate on the audio frames stored in jitter buffer 322 in a first-in first-out fashion to transmit the frames over wireless link 306 to cellular telephone 302.

Bluetooth™ controller 310 within cellular telephone 302 is configured to receive the wirelessly-transmitted audio frames. As shown in FIG. 3, Bluetooth™ controller 310 includes buffer control logic 312 and a jitter buffer 314. Buffer control logic 312 (which may be implemented as software, hardware, or as a combination of software and hardware) is configured to temporarily accumulate the received audio frames within jitter buffer 314 and to transfer the accumulated audio frames from jitter buffer 314 to cellular baseband logic 316 in a first-in-first out fashion. Audio frames are transferred from jitter buffer 314 to cellular baseband logic 316 via a PCM interface 318. Cellular baseband logic 316 is configured to process the audio frames provided from jitter buffer 314 to generate an output audio signal for transmission to another device, such as another telephone.

The clock domain of headset 304 is different than the clock domain of interface 318. By buffering a number of audio frames in jitter buffer 314, buffer control logic 312 can help compensate for this difference, but only to a certain extent. Because jitter buffer 314 has a limited size, buffer control logic 312 is configured to selectively discard audio frames when the number of audio frames available in jitter buffer 314 becomes too great. Buffer control logic 312 is also configured to selectively add audio frames representing silence when there are too few audio frames available in jitter buffer 314 for providing to interface 318.

As noted in the Background Section above, one conventional method for managing a jitter buffer is to maintain a fixed high watermark and a fixed low watermark. When the number of audio frames stored in the jitter buffer exceeds the high watermark, frames are dropped. When the number of audio frames stored in jitter buffer drops below the low watermark, frames are inserted. However, each time a frame is dropped or inserted in this manner, a discontinuity in the output audio signal is created. This discontinuity greatly impacts the quality of the output audio signal as perceived by a listener since human hearing is very sensitive to phase changes.

In accordance with the an embodiment of the present invention, buffer control logic 312 is configured to discard and add audio frames in a manner that reduces this negative impact on the quality of the output audio signal. In particular, as will be described in more detail below, buffer control logic 312 discards or adds frames based not only on the buffer level but also based on the power of the audio frame currently being received by or output from jitter buffer 314. In discarding frames, the goal is to discard less powerful frames to minimize the impact of the adaptation. In adding frames, the goal is to insert silence among less powerful frames, which also minimizes the impact of the adaptation. The specific manner by which buffer control logic 312 operates to discard and add audio frames will now be described with reference to flowcharts 400 and 500 of FIGS. 4 and 5, respectively.

Figure 4:
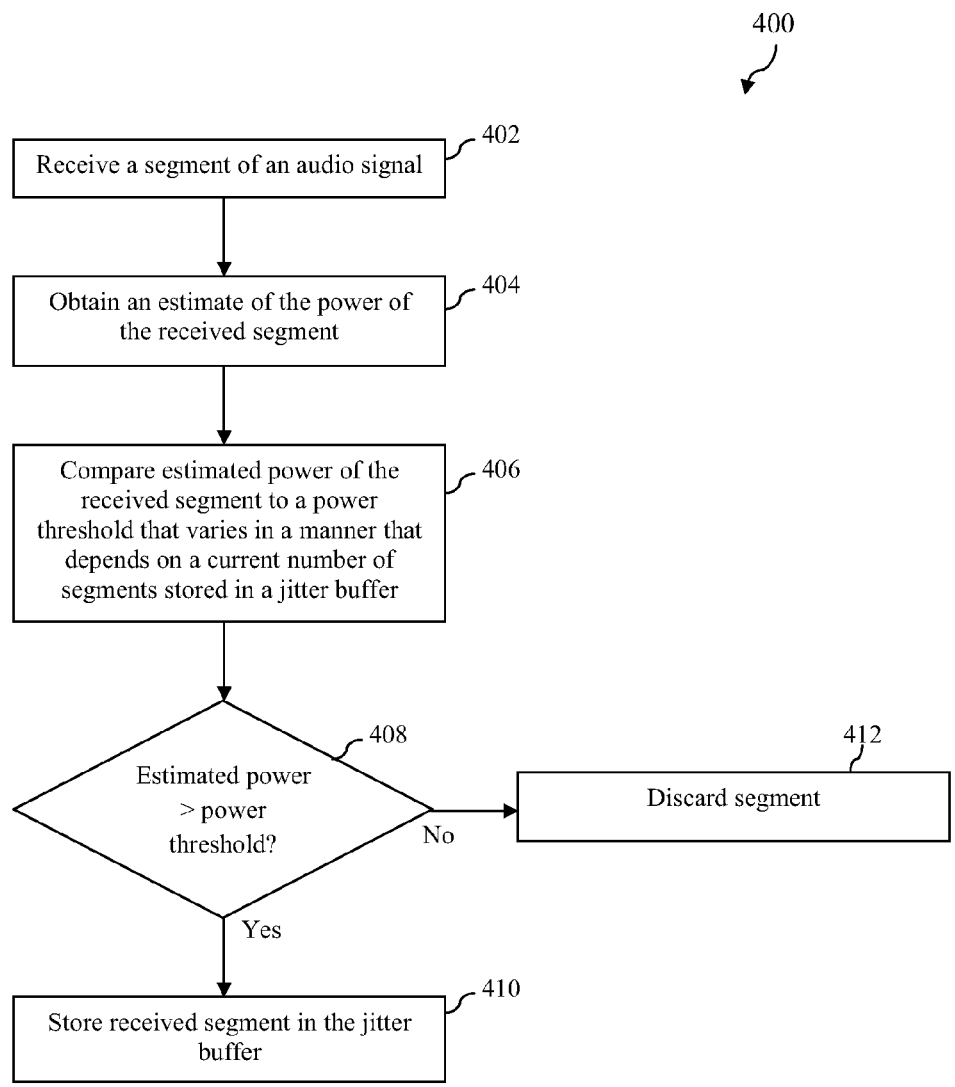
FIG. 4 depicts a flowchart of a method for selectively discarding audio frames to be stored in a jitter buffer in accordance with an embodiment of the present invention.

In particular, FIG. 4 depicts a flowchart 400 of a method for selectively discarding audio frames to be stored in a jitter buffer in accordance with an embodiment of the present invention. The method of flowchart 400 will now be described with reference to certain elements of communication system 300 as described above in reference to FIG. 3. However, as will be discussed in more detail below, the invention is not limited to that implementation.

As shown in FIG. 4, the method of flowchart 400 begins at step 402 in which buffer control logic 312 receives a segment of an audio signal, wherein the received segment is one of a series of segments transmitted from headset 304 over wireless link 306. The segment of the audio signal may comprise a frame of the audio signal. However, the invention is not so limited and the segment of the audio signal may comprise a sub-frame or some other discrete portion of the audio signal.

At step 404, buffer control logic 312 obtains an estimate of the power of the received segment. Buffer control logic 312 may obtain an estimate of the power of the received segment by measuring the power of the received segment using any of a variety of well-known techniques for measuring the power of a portion of an audio signal. For example, buffer control logic 312 may measure the power of the received segment by calculating the root mean squared (RMS) power of the received segment. Alternatively, buffer control logic 312 may obtain an estimate of the power of the received segment from another source. Such other source may include but is not limited to an information field associated with the received segment. For example, MP3 and Bluetooth™ Sub-band Coding (SBC) frames carry information fields that may be used to provide an estimate of frame power.

At step 406, buffer control logic 312 compares the estimated power of the received segment to a power threshold, wherein the power threshold varies in a manner that depends on the current number of segments stored in jitter buffer 314. As shown at decision step 408, if buffer control logic 312 determines that the estimated power of the received segment exceeds the power threshold, then processing proceeds to step 410 and buffer control logic 312 stores the received segment in jitter buffer 314. If, however, buffer control logic 312 determines that the estimated power of the received segment does not exceed the power threshold, then processing proceeds to step 412 and buffer control logic 312 discards the received segment.

Figure 6:
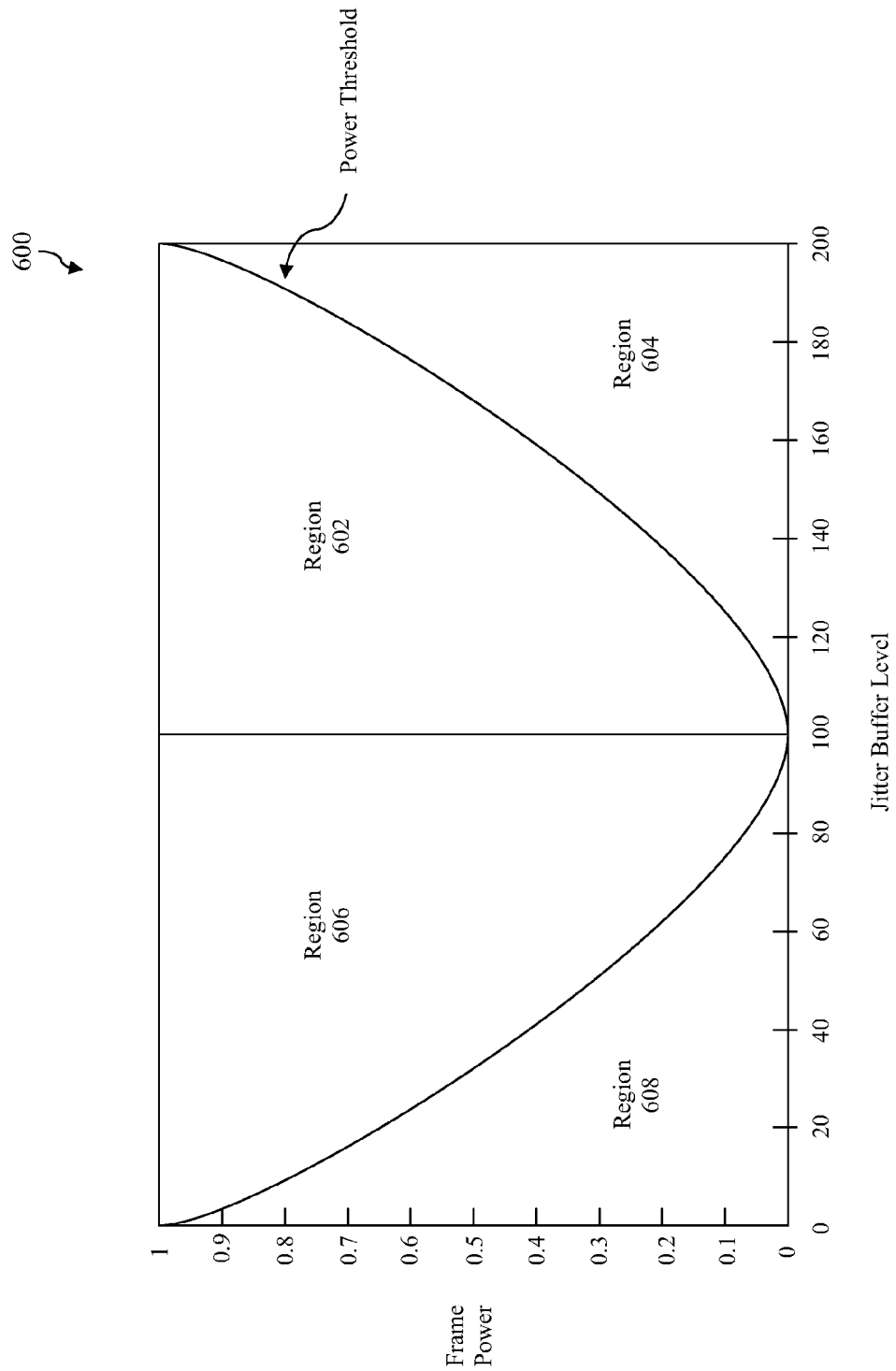
FIG. 6 illustrates a graph showing how a power threshold used for determining whether to discard or add an audio frame varies with a level of a jitter buffer in accordance with one implementation of the present invention.

FIG. 6 illustrates a graph 600 that shows how the power threshold may vary with the level of jitter buffer 314 in accordance with one implementation of the present invention. The horizontal axis of graph 600 represents the number of audio frames that are currently stored in jitter buffer 314, wherein the largest number of audio frames that can be stored is 200. The vertical axis of graph 600 represents the normalized RMS power of the received frame, wherein 0 represents the minimum frame power and 1 represents the maximum frame power. The power threshold used for determining whether to store/discard received audio frames is the curve dividing region 602 of the graph from region 604.

In accordance with one implementation of the present invention, if the number of audio frames currently in the jitter buffer is 100 or less, then buffer control logic 312 will automatically store a received audio frame within jitter buffer 314. However, if the number of audio frames currently in jitter buffer 314 is greater than 100, then buffer control logic 312 will obtain an estimate of the power of the received audio frame and identify a location on graph 600 based on the estimated power and the number of audio frames currently in jitter buffer 314. If the identified location is in region 602, then buffer control logic 312 will store the received audio frame within jitter buffer 314. Conversely, if the identified location is in region 604, then buffer control logic 312 will discard the audio frame.

Since the power threshold increases with the number of audio frames currently in jitter buffer 314, this has the effect of dropping frames of relatively low power in the presence of only a small clock drift but dropping frames of relatively high power only as the number of audio frames stored in jitter buffer 314 approaches buffer capacity. By discarding more low power frames than high power frames in this manner, the impact of the dropped frames upon the quality of the output audio signal is reduced.

It is to be understood that graph 600 represents only one manner in which power threshold may vary with jitter buffer level. For example, in alternate embodiments of the present invention, the power threshold may be reduced along the decision curve to further improve the quality of the output audio signal or may be increased along the decision curve to further reduce jitter. Persons skilled in the relevant art(s) will readily appreciate that the decision curve may be selected on an application-by-application basis to provide the desired mix of audio quality and jitter control.

In one embodiment of the present invention, buffer control logic 312 performs the steps of flowchart 400 for every audio frame received over wireless link 306. In an alternate embodiment of the present invention, buffer control logic 312 performs the steps of flowchart 400 for only a subset of the audio frames received over wireless link in order to reduce the number of times an adaptation must be performed. For example, buffer control logic 312 may perform the steps of flowchart 400 for every $n^{th}$ audio frame received over wireless link 306, wherein n is a positive integer greater than 1. For audio frames in between every $n^{th}$ audio frame, the power threshold used by buffer control logic 312 to make a decision regarding storing/discarding an audio frame may remain fixed.

Figure 5:
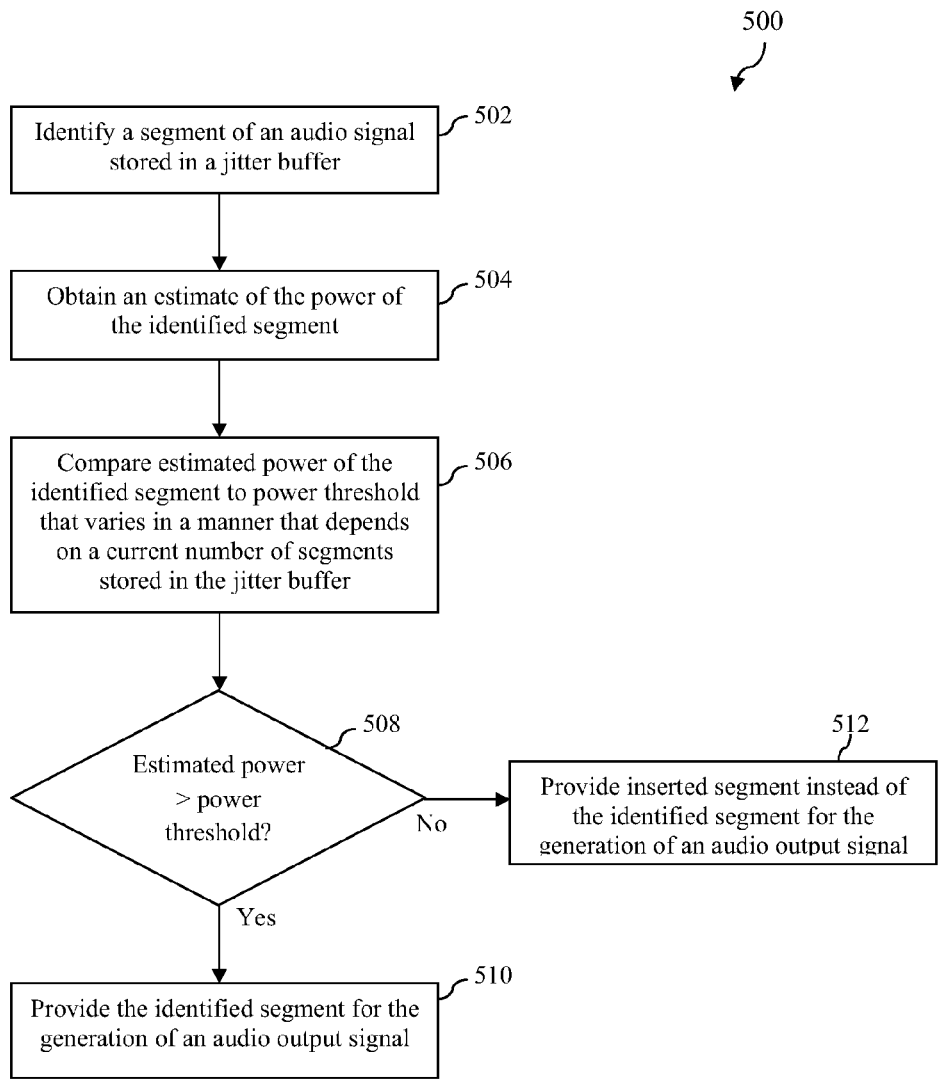
FIG. 5 depicts a flowchart of a method for selectively adding audio frames to audio frames output from a jitter buffer in accordance with an embodiment of the present invention.

FIG. 5 depicts a flowchart 500 of a method for selectively adding audio frames to audio frames output from a jitter buffer in accordance with an embodiment of the present invention. Like the method of flowchart 400 of FIG. 4, the method of flowchart 500 will be described with reference to certain elements of communication system 300 as described above in reference to FIG. 3. However, as will be discussed in more detail below, the invention is not limited to that implementation.

As shown in FIG. 5, the method of flowchart 500 begins at step 502 in which buffer control logic 312 identifies a segment of an audio signal stored in jitter buffer 314, wherein the identified segment is one of a series of segments transmitted from headset 304 over wireless link 306 and stored in jitter buffer 314. In one embodiment, the identified segment is the next segment to be provided to cellular baseband logic 316 from jitter buffer 314. The identified segment may comprise a frame of the audio signal. However, the invention is not so limited and the identified segment of the audio signal may comprise a sub-frame or some other discrete portion of the audio signal.

At step 504, buffer control logic 312 obtains an estimate of the power of the identified segment. Buffer control logic 312 may obtain an estimate of the power of the identified segment by measuring the power of the identified segment using any of a variety of well-known techniques for measuring the power of a portion of an audio signal. For example, buffer control logic 312 may measure the power of the identified segment by calculating the root mean squared (RMS) power of the identified segment. Alternatively, buffer control logic 312 may obtain an estimate of the power of the identified segment from another source. Such other source may include but is not limited to an information field associated with the identified segment. For example, MP3 and Bluetooth™ SBC frames carry information fields that may be used to provide an estimate of frame power.

At step 506, buffer control logic 312 compares the estimated power of the identified segment to a power threshold, wherein the power threshold varies in a manner that depends on the current number of segments stored in jitter buffer 314. As shown at decision step 508, if buffer control logic 312 determines that the estimated power of the identified segment exceeds the power threshold, then processing proceeds to step 510 and buffer control logic 312 provides the identified segment to cellular baseband logic 316, which uses the identified segment to generate an audio output signal as discussed above. However, if buffer control logic 312 determines that the estimated power of the received segment does not exceed the power threshold, then processing proceeds to step 512 and buffer control logic 312 provides an inserted segment to cellular baseband logic 316 instead of the identified segment. Cellular baseband logic 316 uses the inserted segment to generate the audio output signal. In one embodiment, the inserted segment represents silence although the invention is not limited to such an implementation.

As noted above, graph 600 of FIG. 6 shows how the power threshold may vary with the level of jitter buffer 314 in accordance with one implementation of the present invention. The power threshold used for determining whether to insert frames when providing audio frames from jitter buffer 314 to cellular baseband logic 316 is the curve dividing region 606 of the graph from region 608.

In accordance with one implementation of the present invention, if the number of audio frames currently in the jitter buffer is 100 or greater, then buffer control logic 312 will automatically provide audio frames stored within jitter buffer 314 to cellular baseband logic 316 without inserting any frames. However, if the number of audio frames currently in jitter buffer 314 is less than 100, then buffer control logic 312 will obtain an estimate of the power of the identified audio frame and identify a location on graph 600 based on the estimated power and the number of audio frames currently in jitter buffer 314. If the identified location is in region 606, then buffer control logic 312 will provide the identified audio frame to cellular baseband logic 316. Conversely, if the identified location is in region 608, then buffer control logic 312 will provide an inserted audio frame to cellular baseband logic 316.

Since the power threshold increases as the number of audio frames currently in jitter buffer 314 decreases, this has the effect of inserting silence frames among relatively low power frames in the presence of only a small clock drift but inserting silence frames among relatively high power frames only as the number of audio frames stored in jitter buffer 314 approaches zero. By inserting silence frames among more low power frames than high power frames in this manner, the impact of the inserted frames upon the quality of the output audio signal is reduced.

It is to be understood that graph 600 represents only one manner in which power threshold may vary with jitter buffer level. For example, in alternate embodiments of the present invention, the power threshold may be reduced along the decision curve to further improve the quality of the output audio signal or may be increased along the decision curve to further reduce jitter. Persons skilled in the relevant art(s) will readily appreciate that the decision curve may be selected on an application-by-application basis to provide the desired mix of audio quality and jitter control.

In one embodiment of the present invention, buffer control logic 312 performs the steps of flowchart 500 for every audio frame stored in jitter buffer 314. In an alternate embodiment of the present invention, buffer control logic 312 performs the steps of flowchart 500 for only a subset of the audio frames stored in jitter buffer 314 in order to reduce the number of times an adaptation must be performed. For example, buffer control logic 312 may perform the steps of flowchart 500 for every $n^{th}$ audio frame to be output from jitter buffer 314 to cellular baseband logic 316, wherein n is a positive integer greater than 1. For audio frames in between every $n^{th}$ audio frame, the power threshold used by buffer control logic 312 to make a decision regarding inserting an audio frame may remain fixed.

Figure 7:
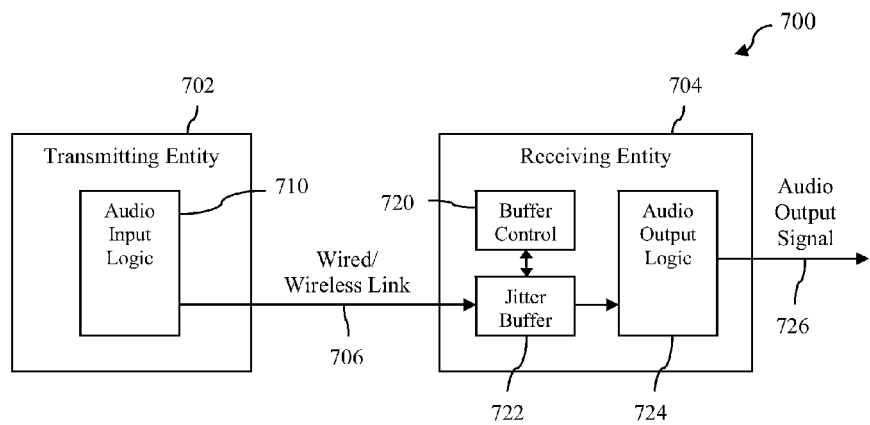
FIG. 7 is a block diagram of a first general audio communication system in which an embodiment of the present invention may be implemented.

B. Generalized Audio Communication Systems in Accordance with Embodiments of the Present Invention Although an embodiment of the present invention was described above in reference to a Bluetooth™ wireless communication system, the present invention may be implemented in any wireless or wired communication system in which audio signals are transmitted between entities operating in different clock domains. For example, FIG. 7 is a block diagram of a general audio communication system 700 in which an embodiment of the present invention may be implemented. As shown in FIG. 7, audio communication system 700 includes a transmitting entity 702 and a receiving entity 704, each of which operates in a different clock domain.

Transmitting entity 702 and receiving entity 704 are communicatively connected via a wired or wireless link 706. Wired or wireless link 706 may provide a bidirectional or unidirectional communication path between transmitting entity 702 and receiving entity 704.

Transmitting entity 702 includes audio input logic 710 that is configured to obtain an audio input signal from an audio source. Transmitting entity 702 is configured to transmit the audio input signal to receiving entity 704 as a series of discrete segments via wired or wireless link 706. At receiving entity 704, the transmitted audio segments are received and temporarily accumulated within a jitter buffer 722 prior to being transferred in a first-in-first-out fashion to audio output logic 724. Audio output logic 724 processes the segments from jitter buffer 722 to generate an audio output signal 726. Depending upon the design of receiving entity 704, audio output signal 726 may be played back to a user or transmitted to another device or system for further processing.

The storage of audio segments in jitter buffer 722 and the delivery of audio segments from jitter buffer 722 to audio output logic 724 are managed by buffer control logic 720. In particular, buffer control logic 720 selectively discards certain audio segments prior to storage in jitter buffer 722 in accordance with the general method of flowchart 400 as described above in reference to FIG. 4. Furthermore, buffer control logic 720 selectively adds audio segments to audio segments output from jitter buffer 722 in accordance with the general method of flowchart 500 as described above in reference to FIG. 5. This has the effect of controlling jitter that may be caused by drift between the two clocks associated with transmitting entity 702 and receiving entity 704, respectively, while also reducing the adverse effects on audio quality which can be caused by dropping or inserting audio segments.

Figure 8:
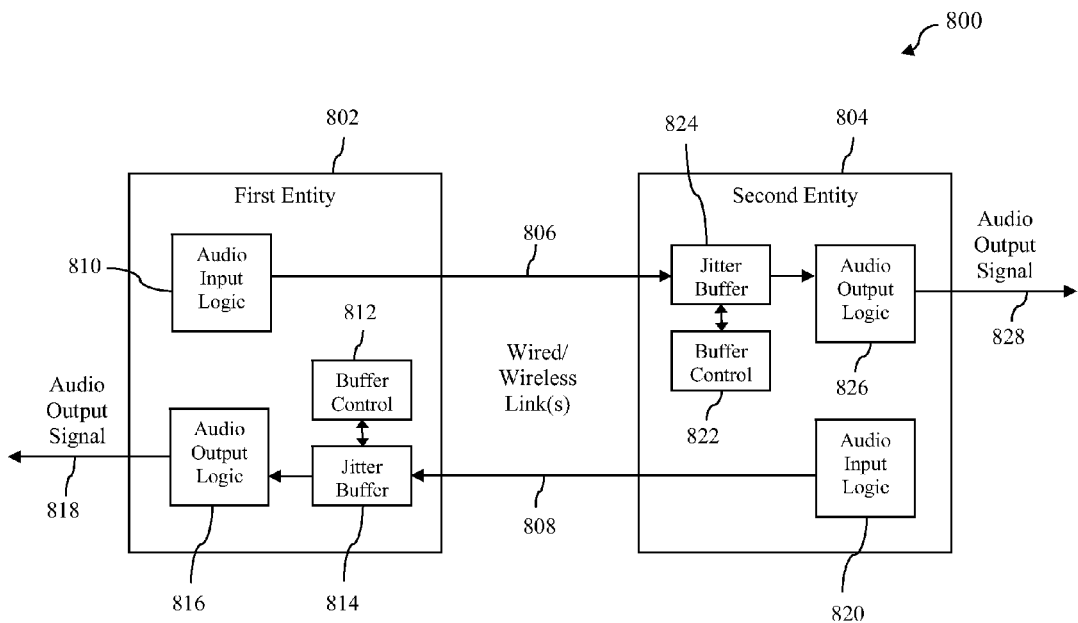
FIG. 8 is a block diagram of a second general audio communication system in which an embodiment of the present invention may be implemented.

FIG. 8 is a block diagram of another general audio communication system 800 in which an embodiment of the present invention may be implemented. As shown in FIG. 8, general audio communication system 800 includes a first entity 802 and a second entity 804, each of which operates in a different clock domain and each of which implements buffer control logic in accordance with an embodiment of the present invention.

First entity 802 is capable of transmitting audio segments generated by audio input logic 810 to second entity 804 via a wired or wireless link 806. Second entity 802 is capable of transmitting audio segments generated by audio input logic 820 to first entity 802 via a wired or wireless link 808. Depending upon the implementation, links 806 and 808 may be carried over separate physical layers or a combined physical layer.

First entity 802 includes a jitter buffer 814 for temporarily accumulating audio segments received from second entity 804 prior to providing the audio segments to audio output logic 816. Jitter buffer 814 is managed by buffer control logic 812 in a manner consistent with the methods described above with reference to flowchart 400 of FIG. 4 and flowchart 500 of FIG. 5.

Likewise, second entity 804 includes a jitter buffer 824 for temporarily accumulating audio segments received from first entity 802 prior to providing the audio segments to audio output logic 826. Jitter buffer 824 is managed by buffer control logic 822 in a manner consistent with the methods described above with reference to flowchart 400 of FIG. 4 and flowchart 500 of FIG. 5.

General audio communication systems 700 of FIG. 7 and general audio communication system 800 of FIG. 8 have been described herein by way of example only and are not intended to limit the present invention. Persons skilled in the relevant art(s) will readily appreciate that the present invention may be implemented in a wide variety of audio communication systems beyond those shown in FIG. 7 and FIG. 8.

C. Conclusion

A system and method for discarding or inserting audio frames in a jitter buffer has been described that provides improved audio quality as compared to conventional jitter buffer management systems. In particular, the system and method makes drift compensation less noticeable as compared to conventional jitter buffer management systems. Furthermore, the system and method improves audio quality even when there is a large clock drift between entities communicating audio content.

Another advantage of a system in accordance with an embodiment of the present invention is that if the system is followed by packet loss concealment (PLC), the system will make the PLC more efficient. This is because most PLC algorithms are based on prediction from a historical buffer. Reducing discontinuities in this buffer will assist the PLC algorithm in avoiding the reproduction of similar errors in synthesized packets. Furthermore, if the system is followed by an echo canceller, the system will avoid a substantial variation in the bulk delay seen by the echo canceller. This will typically make the echo canceller more efficient.

While various embodiments of the present invention have been described above, it should be understood that they have been presented by way of example only, and not limitation. It will be understood by those skilled in the relevant art(s) that various changes in form and details may be made to the embodiments of the present invention described herein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for generating an output audio signal in a communication system, comprising:
   (a) receiving a segment of an audio signal, wherein the received segment is one of a series of segments of an audio signal transmitted over a communication link;
   (b) obtaining an estimate of the power of the received segment;
   (c) comparing the estimated power of the received segment to a power threshold that varies in a manner that depends on a current number of segments stored in a jitter buffer;
   (d) storing the received segment in the jitter buffer if the estimated power of the received segment exceeds the power threshold and discarding the received segment if the estimated power of the received segment does not exceed the power threshold; and
   (e) generating an output audio signal from segments stored in the jitter buffer.

2. The method of claim 1, wherein the received segment of the audio signal comprises a frame of the audio signal.

3. The method of claim 1, wherein the received segment is one of a series of segments of an audio signal transmitted over a wired or wireless communication link.

4. The method of claim 1, wherein obtaining an estimate of the power of the received segment comprises calculating the root mean squared power of the received segment.

5. The method of claim 1, wherein the power threshold increases as the current number of segments stored in the jitter buffer increases.

6. The method of claim 1, further comprising:
   performing steps (a) through (d) for every other segment in the series of segments.

7. The method of claim 1, further comprising:
   performing steps (a) through (d) for only a subset of the other segments in the series of segments.

8. The method of claim 7, wherein performing steps (a) through (d) for only a subset of the other segments in the series of segments comprises:
   performing steps (a) through (d) for every $n^{th}$ segment in the series of segments, wherein n is a positive integer greater than 1.

9. A system for generating an output audio signal, comprising:
   a jitter buffer;
   buffer control logic configured to receive a plurality of segments of an audio signal transmitted over a communication link, to obtain an estimate of the power of each of the received segments, to store a received segment in the jitter buffer if the estimated power of the received segment exceeds a power threshold, and to discard a received segment if the estimated power of the received segment does not exceed the power threshold, wherein the power threshold varies in a manner that depends on a current number of segments stored in the jitter buffer; and
   audio output logic configured to generate an output audio signal from segments stored in the jitter buffer.

10. The system of claim 9, wherein the plurality of segments of the audio signal comprise a plurality of frames.

11. The system of claim 9, wherein the buffer control logic is configured to receive a plurality of segments of an audio signal transmitted over a wireless communication link.

12. The system of claim 9, wherein the buffer control logic is configured to receive a plurality of segments of an audio signal transmitted over a wired communication link.

13. The system of claim 9, wherein the buffer control logic is configured to obtain an estimate of the power of each of the received segments by calculating the root mean squared power of each of the received segments.

14. The system of claim 9, wherein the power threshold increases as the current number of segments stored in the jitter buffer increases.

15. The system of claim 9, wherein the plurality of segments comprises every segment in a series of consecutively-received segments.

16. The system of claim 9, wherein the plurality of segments comprises a subset of a series of consecutively-received segments.

17. The system of claim 9, wherein the plurality of segments comprises every $n^{th}$ segment in a series of consecutively-received segments, wherein n is a positive integer greater than 1.

18. A system for generating an output audio signal, comprising:
   a jitter buffer;
   buffer control logic configured to receive a plurality of segments of an audio signal transmitted over a communication link, to obtain an estimate of the power of each of the received segments, to store a received segment in the jitter buffer if the estimated power of the received segment exceeds a power threshold, and to discard a received segment if the estimated power of the received segment does not exceed the power threshold, wherein the power threshold varies in a manner that depends on a current number of segments stored in the jitter buffer; and packet loss concealment logic configured to predict an output audio signal based on segments stored in the jitter buffer.

19. The system of claim 18, wherein the buffer control logic is configured to obtain an estimate of the power of each of the received segments by calculating the root mean squared power of each of the received segments.

20. The system of claim 18, wherein the power threshold increases as the current number of segments stored in the jitter buffer increases.

* * * * *